(12) United States Patent
Mcentyre (10) Patent No.: US 10,520,118 B2
(45) Date of Patent: Dec. 31, 2019

(54) TUBE FITTING ASSEMBLY

(71) Applicant: CIRCOR INTERNATIONAL, INC., Burlington, MA (US)

(72) Inventor: Richard Michael Mcentyre, Greer, SC (US)

(73) Assignee: CIRCOR INTERNATIONAL, Burlington, MA (US)

( * ) Notice: Subject to any disclaimer, the term of this patent is extended or adjusted under 35 U.S.C. 154(b) by 74 days.

(21) Appl. No.: 15/971,427

(22) Filed: May 4, 2018

(65) Prior Publication Data

US 2018/0328523 A1  Nov. 15, 2018

Related U.S. Application Data (60) Provisional application No. 62/504,884, filed on May 11, 2017.

(51) Int. Cl.
| | |
|---|---|
| *F16L 19/10* | (2006.01) |
| *F16L 19/07* | (2006.01) |
| *F16L 19/06* | (2006.01) |

(52) U.S. Cl.
CPC ............ *F16L 19/103* (2013.01); *F16L 19/061* (2013.01); *F16L 19/07* (2013.01)

(58) Field of Classification Search
CPC ....... F16L 19/103; F16L 19/061; F16L 19/08; F16L 19/065; F16L 19/10
USPC ...................... 285/341, 342, 382.7, 389, 385
See application file for complete search history.

(56) References Cited

U.S. PATENT DOCUMENTS

| | | | |
|---|---|---|---|
| 3,103,373 A | 9/1963 | Lennon et al. | |
| 3,215,457 A * | 11/1965 | Teeters ................ | F16L 19/103 285/341 |
| 3,321,947 A * | 5/1967 | Teeters ................ | B21K 1/16 72/377 |
| 3,433,508 A * | 3/1969 | Teeters ................ | F16L 19/103 285/341 |
| 3,445,128 A | 5/1969 | Teeters | |

(Continued)

FOREIGN PATENT DOCUMENTS

| | | |
|---|---|---|
| EP | 1607669 A2 | 12/2005 |
| EP | 2762759 A1 | 8/2014 |

(Continued)

*Primary Examiner* — Aaron M Dunwoody
(74) *Attorney, Agent, or Firm* — McNees Wallace & Nurick LLC (57) ABSTRACT

A fitting assembly having a longitudinal axis including a fitting body having a seat, a threaded drive nut, a tube, a first (rear) ferrule and a second (front) ferrule receivable over the tube, the first (rear) ferrule having a first driven end and a first driving end and defining a first (rear) ferrule length (FFL) therebetween, the second (front) ferrule having a second driven end and a second driving end and defining a second (front) ferrule length (SFL) therebetween, and a seal depth (SD) of the tube defined by a distance between the seat of the fitting body and the second driving end. A surface of the second driven end of the second (front) ferrule is a diametrical surface having a diameter ($D_{SF}$). At least one of the following apply:

SFL/SD≥0.9;

2.7≥SFL/$D_{SF}$≥2.2; and

SFL/FFL≥4.0.

20 Claims, 10 Drawing Sheets

(56) References Cited

U.S. PATENT DOCUMENTS

| | | | |
|---|---|---|---|
| 3,695,647 A * | 10/1972 | Pugliese | F16L 19/103 |
| | | | 285/341 |
| 4,076,286 A | 2/1978 | Spontelli | |
| 5,217,261 A | 6/1993 | DeWitt et al. | |
| 6,851,729 B2 | 2/2005 | Gibson | |
| 8,876,170 B2 | 11/2014 | Williams et al. | |
| 9,033,372 B2 | 5/2015 | Arstein et al. | |
| 9,267,627 B2 | 2/2016 | Bennett et al. | |
| 9,726,309 B1 | 8/2017 | Rowley et al. | |
| 2008/0007050 A1 * | 1/2008 | Williams | F16L 19/086 |
| | | | 285/249 |
| 2008/0012301 A1 * | 1/2008 | Arstein | F16L 19/103 |
| | | | 285/249 |
| 2014/0232111 A1 | 8/2014 | Shimamura et al. | |
| 2016/0146383 A1 * | 5/2016 | Gibson | F16L 19/10 |
| | | | 285/382.4 |
| 2016/0195204 A1 | 7/2016 | Bennett et al. | |
| 2017/0059065 A1 | 3/2017 | Williams et al. | |

FOREIGN PATENT DOCUMENTS

| | | |
|---|---|---|
| EP | 2489912 B1 | 3/2016 |
| KR | 101633947 B1 | 6/2016 |
| WO | 2014205246 A2 | 12/2014 |

\* cited by examiner

TUBE FITTING ASSEMBLY

FIELD OF THE INVENTION

The present invention is directed to compression fittings for conveying pressurized media (or vacuum applications) and specifically to ferruled-type compression fittings. Fittings may be used for coupling ends of tubing, as well as connections of tubing to valves, flanges, gauges, cylinders, regulators or any other type of instrumentation device or equipment.

BACKGROUND OF THE INVENTION

Tubing systems utilizing ferruled-type compression fittings are defined by maximum allowable working pressures for safe transport of media. These systems frequently handle dangerous gases and liquids that must be capable of withstanding ever-increasing pressures either from intentional system pressure requirements or from equipment failure, which may give rise to pressures unintended by the system designer. Allowable stresses for tubing systems are defined in Boiler & Pressure Vessel codes & Process Piping codes and defined by material and temperature. When provided with the tube outer diameter and wall thickness, the maximum allowable working pressure of a specific tube material at various temperatures can be calculated. Ferruled-type compression fittings suffer from a well-known problem relating to a maximum limit for tube wall thickness. Designs and geometries within the industry all maintain a limit to each size of ferruled-type compression fitting for a specified tubing diameter. For example, these limitations are typically defined in tubing data charts for each manufacturer of dual ferruled-type compression fittings. The performance for a particular fitting is defined by the relative size of the ferrules to the wall thickness of the tubing to be deformed. As the wall thickness of a particular size of tubing increases, physical limitations of the fitting are approached. That is, once a certain wall thickness of the tubing is exceeded, the fitting becomes incapable of maintaining a grip on the tubing, due to a lack of deformation of the tubing in contact with or adjacent to the rear ferrule nose. Many tubing systems utilizing ferruled-type compression fittings on the market have not changed designs in more than 40 years.

Moreover, the introduction of newer and stronger tube materials into such conventional ferruled-type compression fittings have resulted in inconsistent fitting performance and unforeseen failure modes, such as premature tube slippage or partial ferrule "bite" and even sheared threads in drive nuts.

What is needed are ferruled-type compression fittings that do not suffer from these drawbacks.

SUMMARY OF THE INVENTION

The present invention relates to a fitting assembly having a longitudinal axis including a fitting body having a seat, the fitting body receiving a tube having an outer diameter, and a threaded drive nut including a drive surface and receivable over the outer diameter of the tube. The fitting assembly further includes a first ferrule receivable over the outer diameter of the tube, the first ferrule having a first driven end and a first driving end and defining a first ferrule length (FFL) therebetween. The fitting assembly further includes a second ferrule receivable over the outer diameter of the tube, the second ferrule having a second driven end and a second driving end and defining a second ferrule length (SFL) therebetween. The fitting assembly further includes a seal depth (SD) of the tube defined by a distance between the seat of the fitting body and the second driving end. The fitting assembly further includes the drive nut surface engaging the first driven end of the first ferrule, the first driving end engaging the second driven end of the second ferrule, and the second driving end engaging the outer diameter of the tube and the fitting body during assembly of the fitting assembly. A surface of the second driven end of the second ferrule corresponding to the first driving end of the first ferrule is a diametrical surface having a diameter ($D_{SF}$), in which $SFL/SD \geq 0.9$, and $2.7 \geq SFL/D_{SF} \geq 2.2$.

The present invention further relates to a fitting assembly having a longitudinal axis including a fitting body having a seat, the fitting body receiving a tube having an outer diameter, and a threaded drive nut comprising a drive surface and receivable over the outer diameter of the tube. The fitting assembly further includes a first ferrule receivable over the outer diameter of the tube, the first ferrule having a first driven end and a first driving end and defining a first ferrule length (FFL) therebetween. The fitting assembly further includes a second ferrule receivable over the outer diameter of the tube, the second ferrule having a second driven end and a second driving end and defining a second ferrule length (SFL) therebetween. The fitting assembly further includes a seal depth (SD) of the tube defined between the seat of the fitting body and the second driving end. The fitting assembly further includes the drive nut surface engaging the first driven end of the first ferrule, the first driving end engaging the second driven end of the second ferrule, and the second driving end engaging the outer diameter of the tube and the fitting body during assembly of the fitting assembly. A surface of the second driven end of the second ferrule corresponding to the first driving end of the first ferrule is a diametrical surface having a diameter ($D_{SF}$), in which $SFL/FFL \geq 4.0$.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention relates to a novel geometry and arrangement for a ferruled-type compression fitting, such as a dual ferrule compression fitting for use with a broad range of tubing wall thicknesses, i.e., thin walls through thick walls, as well as tubing with increased yield strength, including tubing operable in the medium pressure realm. The present invention results in increased maximum allowable operating pressures as compared to fittings utilizing conventional alloys defined in Boiler & Pressure Vessel codes & Process Piping code, as well as exotic alloys, especially alloys that can operate in harsh environments, while providing increasing safety and corrosion protection for longer product life and reduced maintenance costs. Examples of exotic alloys include, but are not limited to, nickel based high strength alloys, corrosion resistant austenitic stainless steels, duplex stainless steels and super duplex stainless steels. These tubing and fittings increase yield strengths beyond conventional compression fittings, such as tubing and fittings designed for austenitic stainless steels, Monel®, and brass.

These ferruled-type compression fittings may be used for coupling ends of tubing, as well as connections of tubing to valves, flanges, gauges, cylinders, regulators or any other type of instrumentation device or equipment.

For purposes herein, tubing operating in the medium pressure realm or at medium pressure is intended to include tubing capable of operating up to at least 15 KSI.

For purposes herein, the term "thick wall tubing" is intended to be considered, irrespective of tubing material composition, capable of operating between 7.5 KSI and 15 KSI.

Figure 1:
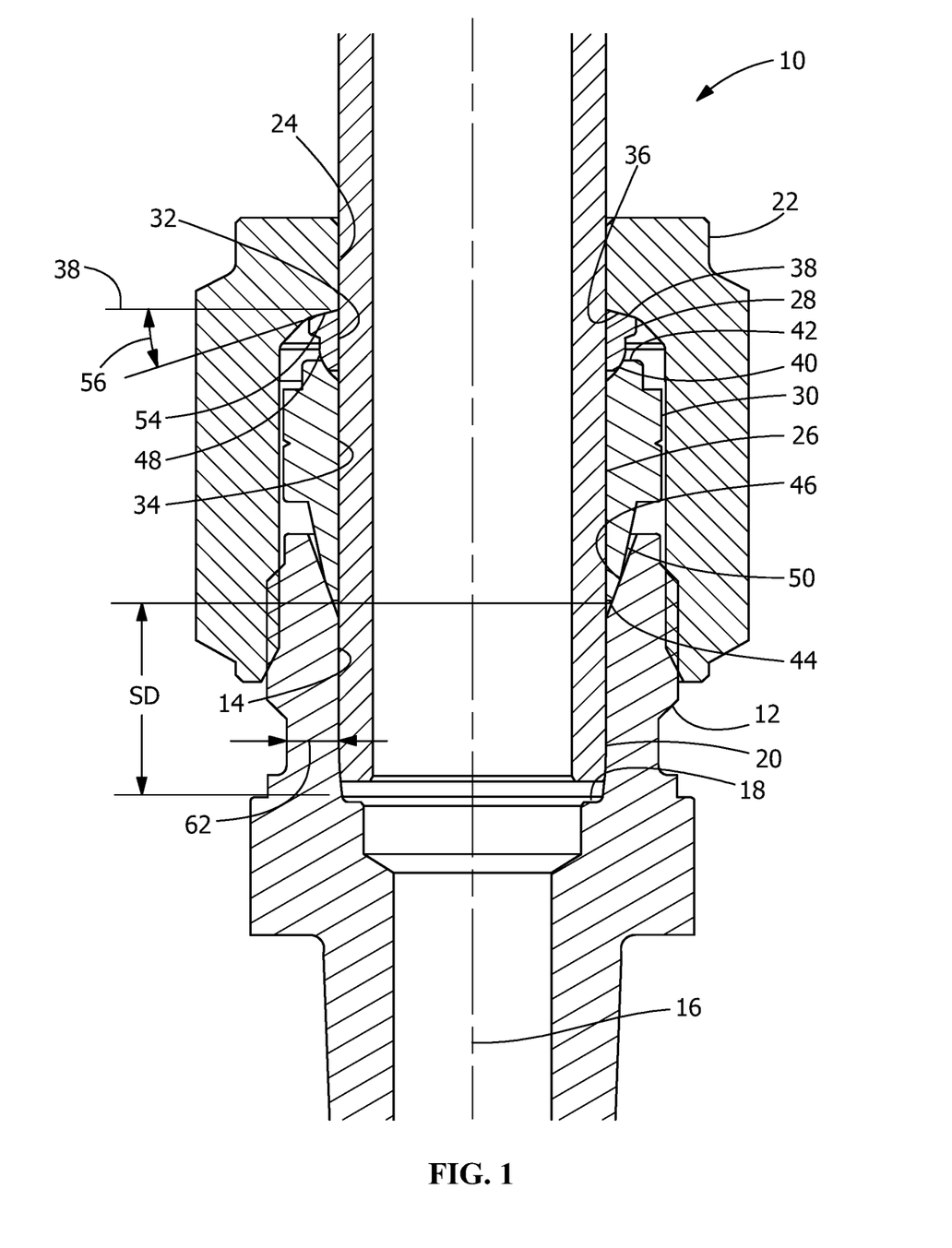
FIG. 1 is a cross section of an exemplary fitting assembly according to the present invention.
Figure 10:
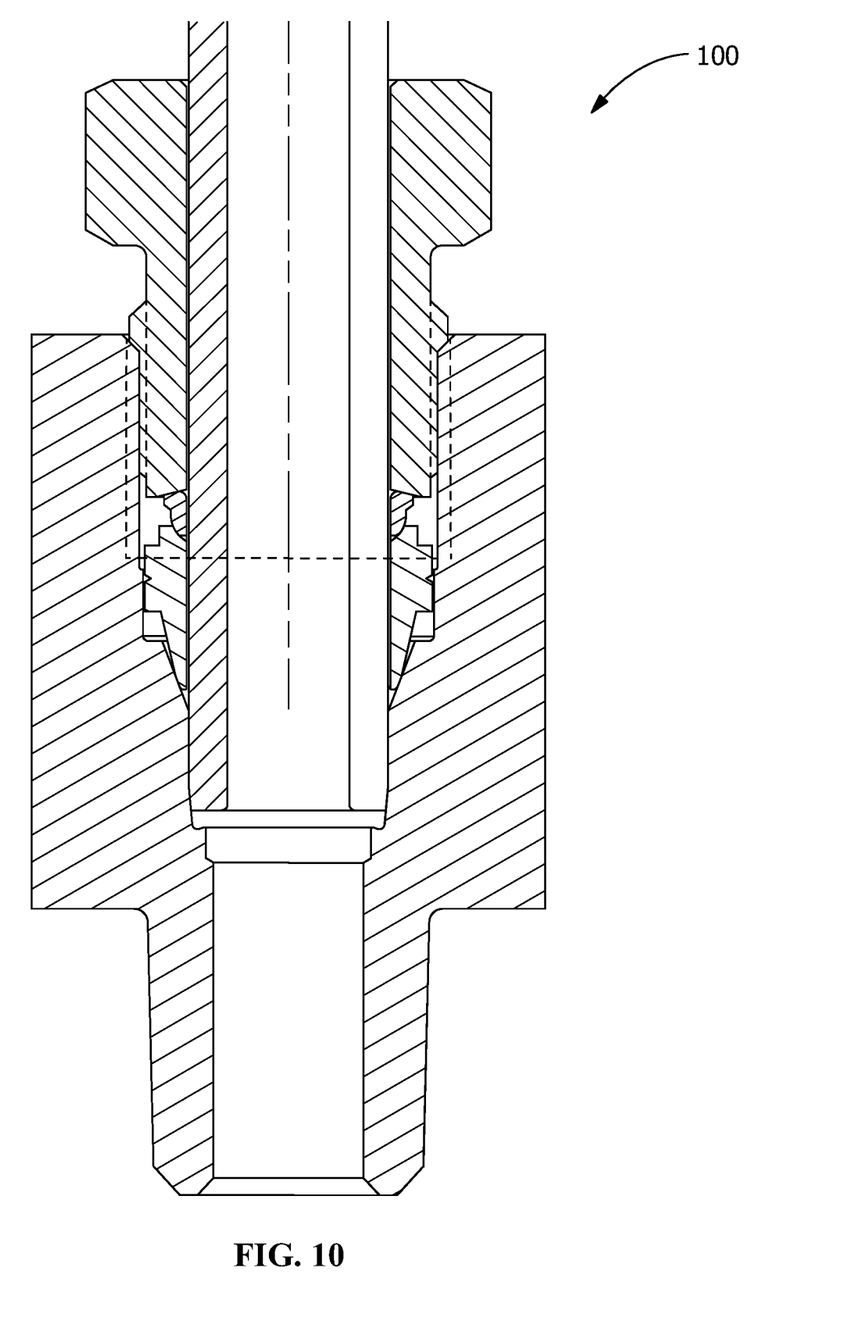
FIG. 10 is a cross section of an exemplary fitting assembly according to the present invention.

As shown in FIG. 1, an exemplary dual ferruled-type compression fitting of a tube fitting assembly 10 is comprised of a receptacle or fitting body 12 including a bore 14 having a longitudinal axis 16 and a seat 18 for receiving a tube 20 therein. A threaded drive nut 22 has an opening 24 that is received by or slidably received over an outer diameter or outer surface 26 of tube 20. Similarly, a rear ferrule or first ferrule 28 and a front ferrule or second ferrule 30 has respective openings 32, 34 that are each also received by or slidably received over the outer diameter or outer surface 26 of tube 20. Once drive nut 22 and ferrules 28, 30 have been installed on the end of tube 20, the end of the tube is inserted into fitting body 12. The fitting connection or assembly of the tube fitting assembly 10 is achieved by threadedly engaging drive nut 22 and fitting body 12. That is, once threadedly engaged, in response to sufficient relative rotational movement in one direction of drive nut 22 about axis 16 relative to fitting body 12, a specific axial compression pattern results, in which a drive nut surface 36 engages a driven end 38 of first (rear) ferrule 28, a driving end 40 of first (rear) ferrule 28 engages a driven end 42 of second (front) ferrule 30, a driving end 44 of second (front) ferrule 30 engages a surface 46 of fitting body 12 and outer surface 26 of tube 20, thereby preventing leakage of media from the end of the tube to exterior of the fitting assembly, or inadvertent removal of the tube from the fitting body. FIG. 1 is directed to a female nut construction that assembles into a male body thread. It is to be understood that tube fitting assembly 100, shown in FIG. 10, which utilizes a male nut construction that assembles into a female threaded body, operates in a similar manner as tube fitting assembly 10, and is not further discussed.

Returning to FIG. 1, the operation of an exemplary dual compression ferruled-type fitting assembly 10 is further discussed. As urged along axis 16 by drive surface 36 of drive nut 22 due to engagement with driven end 38, first (rear) ferrule 28 similarly urges second (front) ferrule 30 into a gap between fitting body 12 and outer surface 26 of the wall of tube 20. Driven end 38 includes a curved transition region 52 (FIG. 3) that engages drive surface 36 of drive nut 22. As a result of threaded engagement of drive nut 22 with fitting body 12, both ferrules 28, 30 are compressed between the drive nut and the fitting body along axis 16. As shown, axis 16 is the same for each of tube 20, nut drive 22, and ferrules 28, 30. Stated another way, the corresponding openings/bores of tube 20 nut drive 22, and ferrules 28, 30 are coaxial along axis 16.

Figure 4:
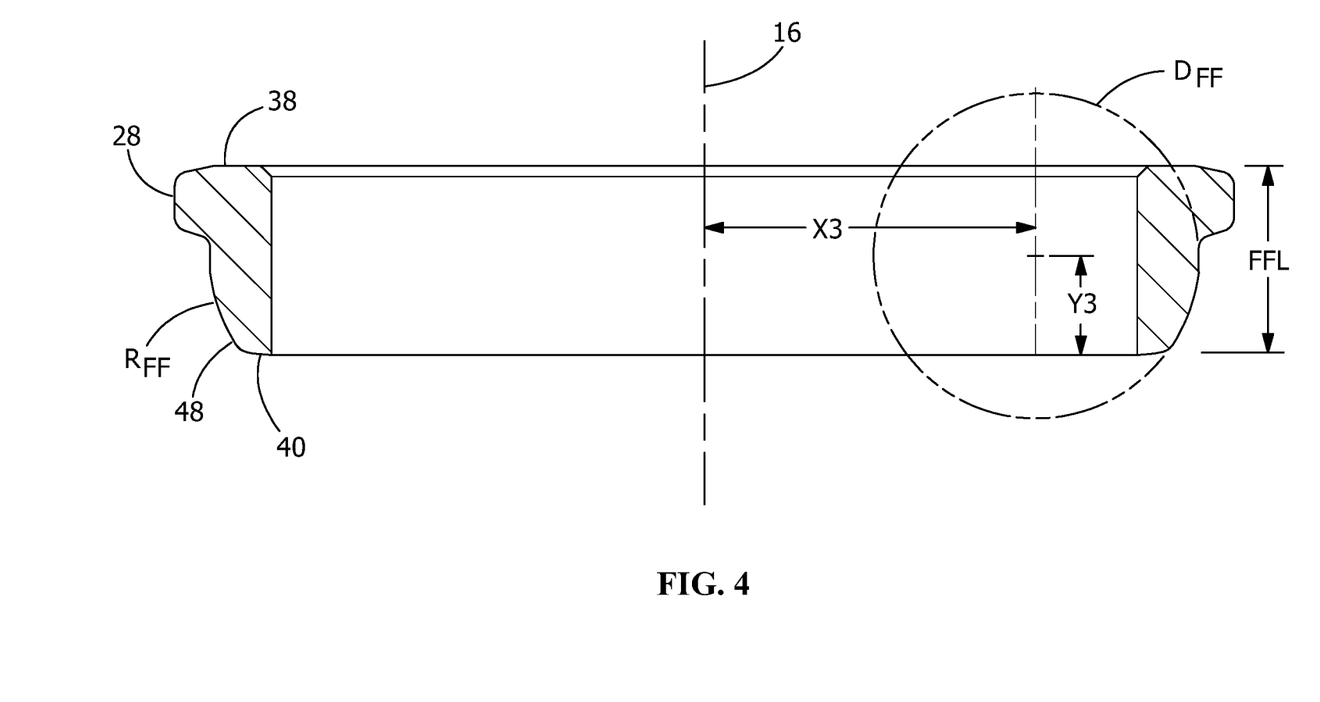
FIG. 4 is an enlarged cross section of an exemplary ferrule according to the present invention.
Figure 5:
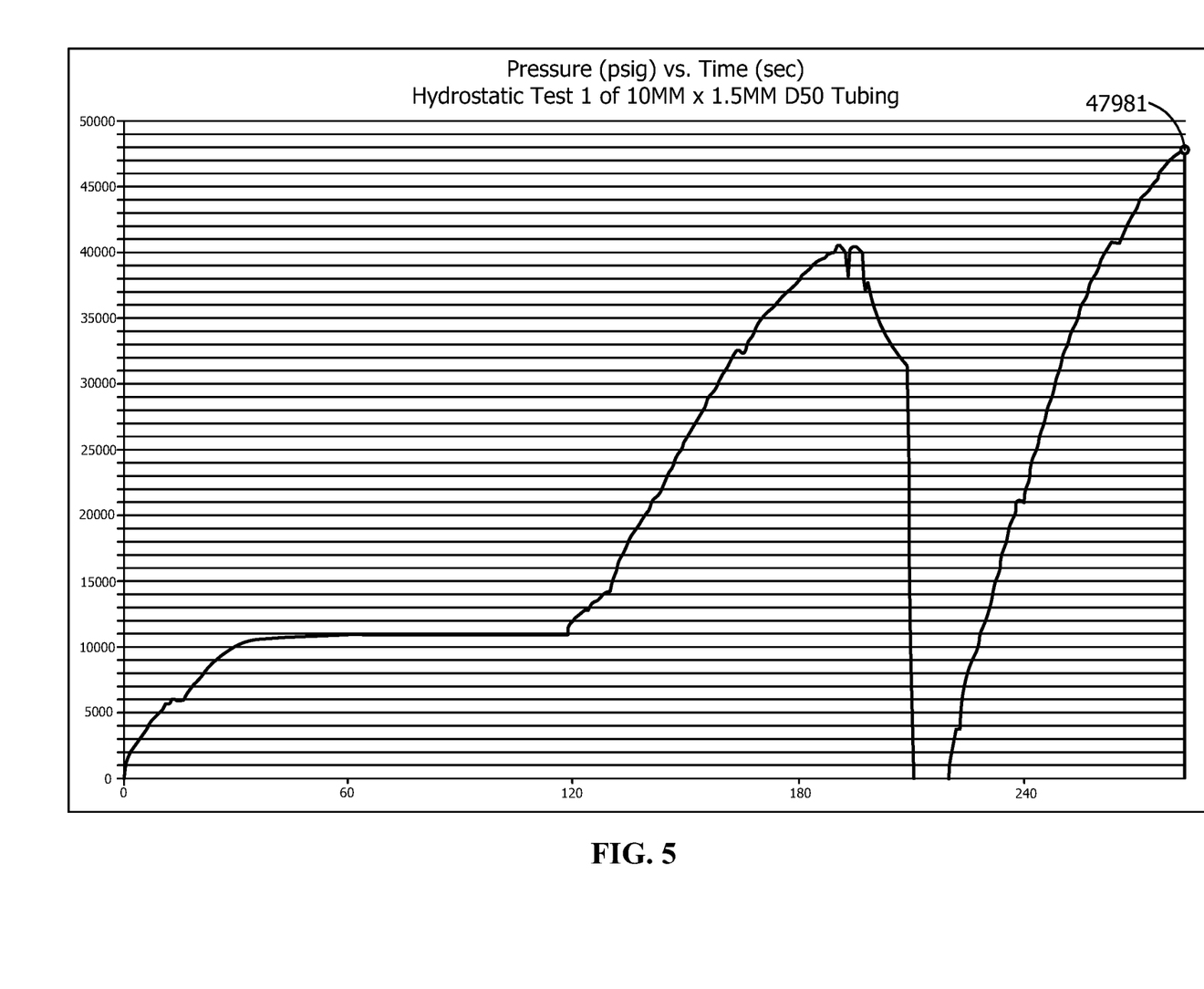
FIGS. 5-9 are graphical burst pressure test results for compression fittings according to the present invention.
Figure 6:
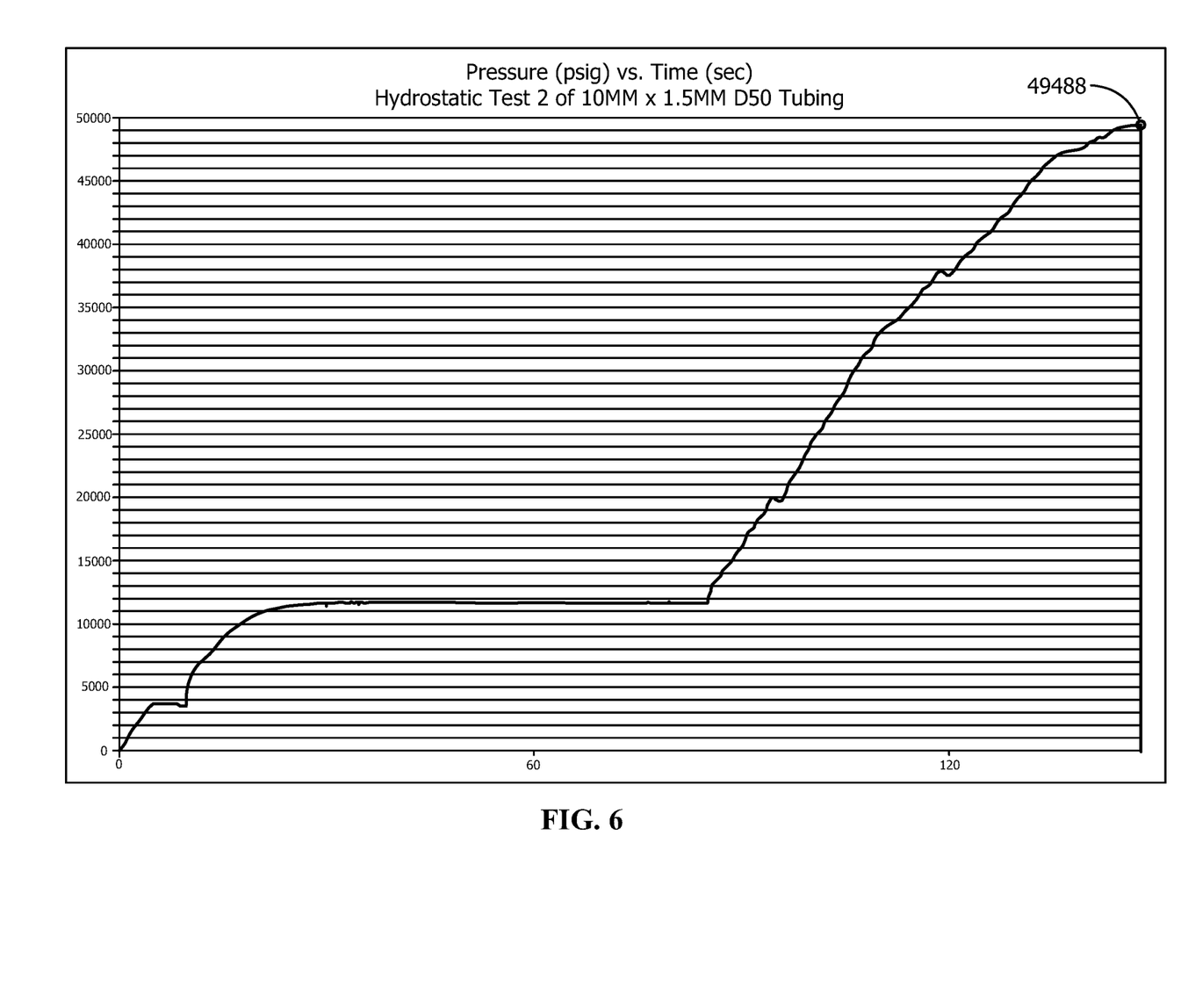
Figure 7:
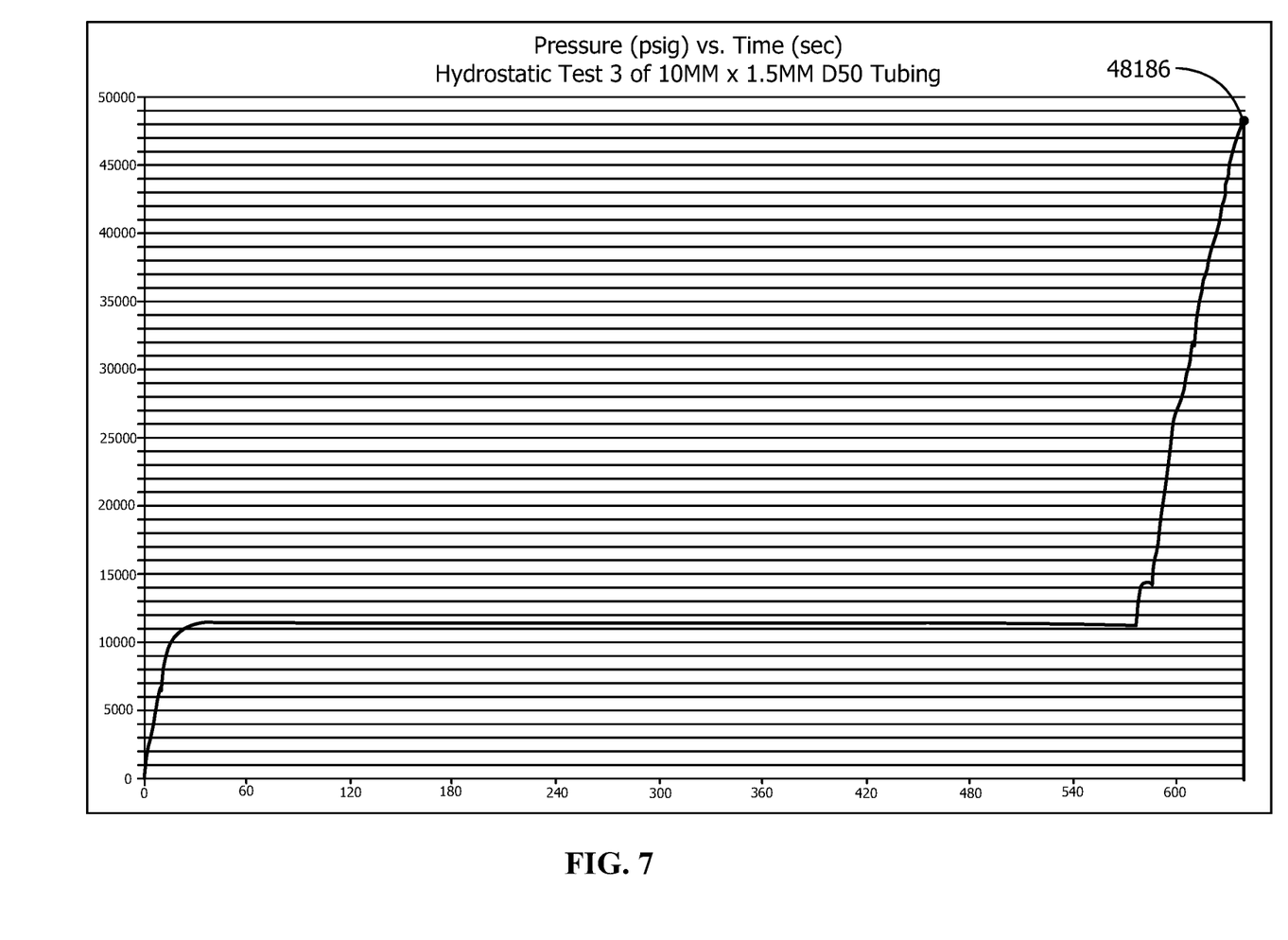
Figure 8:
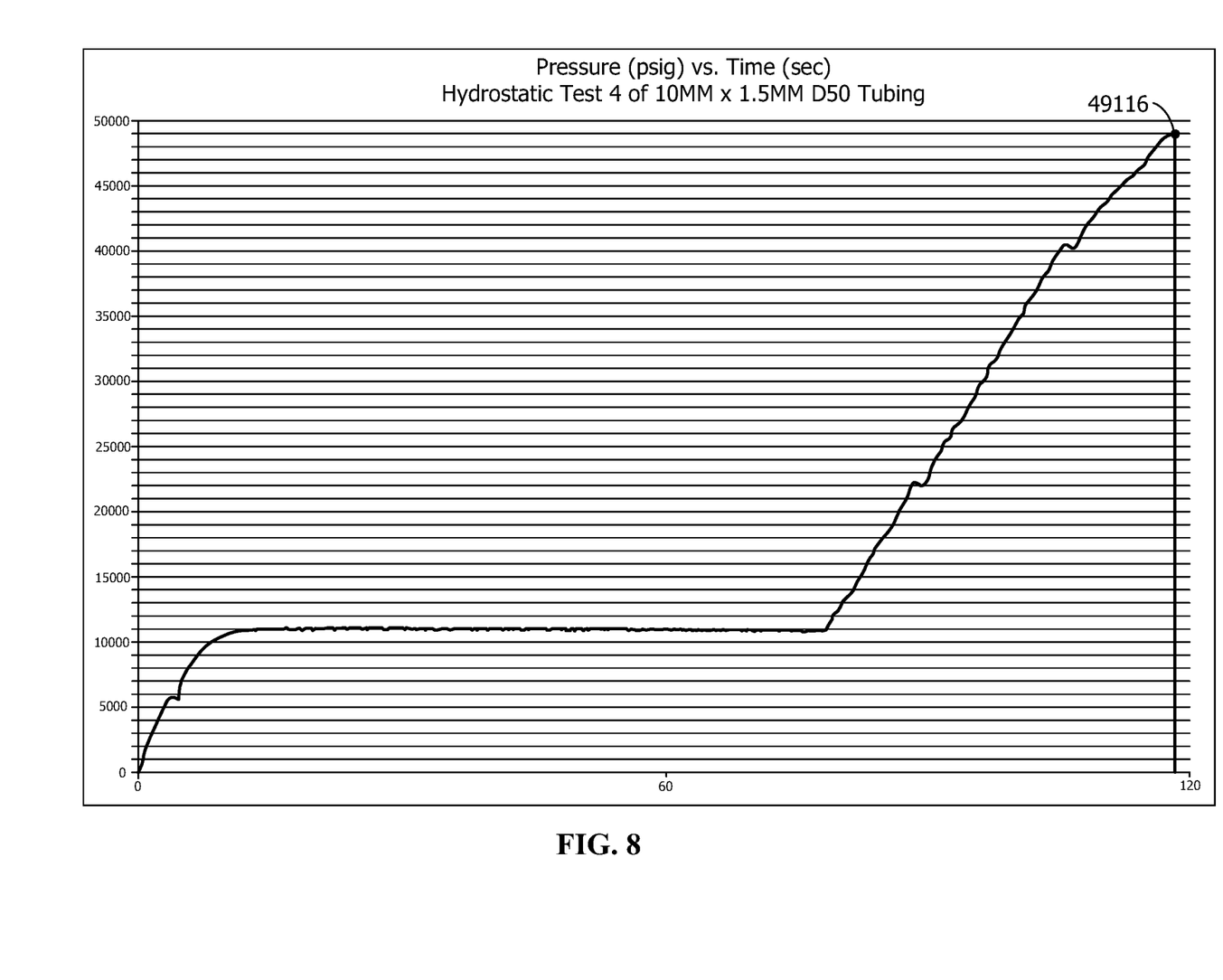
Figure 9:
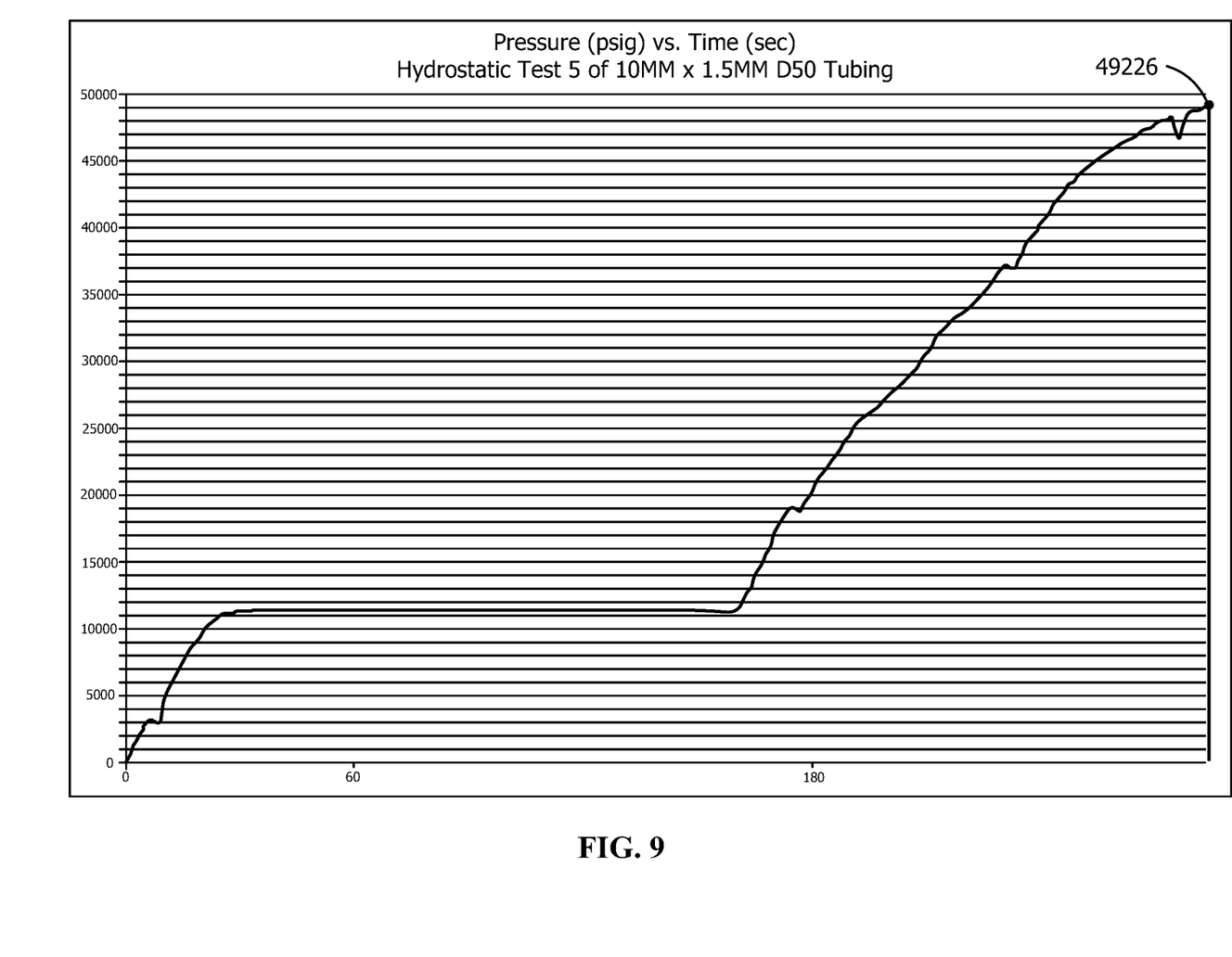

Once the fitting assembly is assembled, ferrules 28, 30 are subjected to axial loads exceeding their respective material yield strengths, and both are deformed. As shown in FIG. 1, driving end 40 of first (rear) ferrule 28 engages driven end 42 of second (front) ferrule 30. For purposes herein, driven end 42 of second (front) ferrule 30 includes a curved surface 58 (FIG. 2) associated with or engaging the corresponding or facing surface of first (rear) ferrule 28. Second (front) ferrule 30 forms a wedge and is held in place by the deformation of a nose 50, which nose terminating at a driving end 44 of the second (front) ferrule on outer tube surface 26. For purposes herein, driving end 44 includes surfaces associated with nose 50. First (rear) ferrule 28 is similarly held in place by deformation of a nose 48, which nose defining a driving end 40 of the first (rear) ferrule onto the tube. For purposes herein, driving end 40 includes a curved surface associated with nose 48, such as diametrical surface ($D_{FF}$) (FIG. 4). The deformations are developed due to various geometries and interactions between fitting body 12 and second (front) ferrule 30, between ferrules 28, 30, as well as first (rear) ferrule 28 interaction/geometry with drive nut 22. Second (front) ferrule 30 typically provides the seal against a liquid or gaseous media being transported within the tubing system. First (rear) ferrule 28 typically enhances the pull-out force required to withstand increasing pressure within the tubing system.

An aspect of the invention to significantly improve the reliability and safety of the dual ferruled-type compression fitting assembly is achieved by increasing the maximum allowable or operating pressures for all designed material types and fitting sizes. The present invention is an improvement compared to design standards established by conventional fitting and ferrules by using a novel geometry. As shown enlarged in FIG. 3, the compression fitting of the present invention offers a curved first (rear) ferrule nose 48 (FIG. 1) facing a corresponding similarly curved surface or pocket of the second (front) ferrule 30 (FIG. 1). Surface 36 (FIG. 1) of drive nut 22 (FIG. 1) includes a sloped region 54 (FIG. 1), positioned at an acute angle 56, such as about a 15 degree angle with respect to a portion of driven end 38 of the first (rear) ferrule 28 that is perpendicular to axis or longitudinal axis 16. These features, when brought together in compression, result in the ends of respective noses 48, 50 of the ferrules 28, 30 to be deformingly urged into the outer surface of the tube 20, as previously discussed. The present invention establishes ratios of design for the ferrules. These new ratios permit operating at increased pressures generally irrespective of the materials used and the magnitude of increased tubular wall thickness for most tubing connections. These ratios determine ferrule sizing, mating curvature placement and size, ferrule engagement position and recommended tubing depth within body receptacles, and generally may be used for all sizes of compression fittings.

Figure 2:
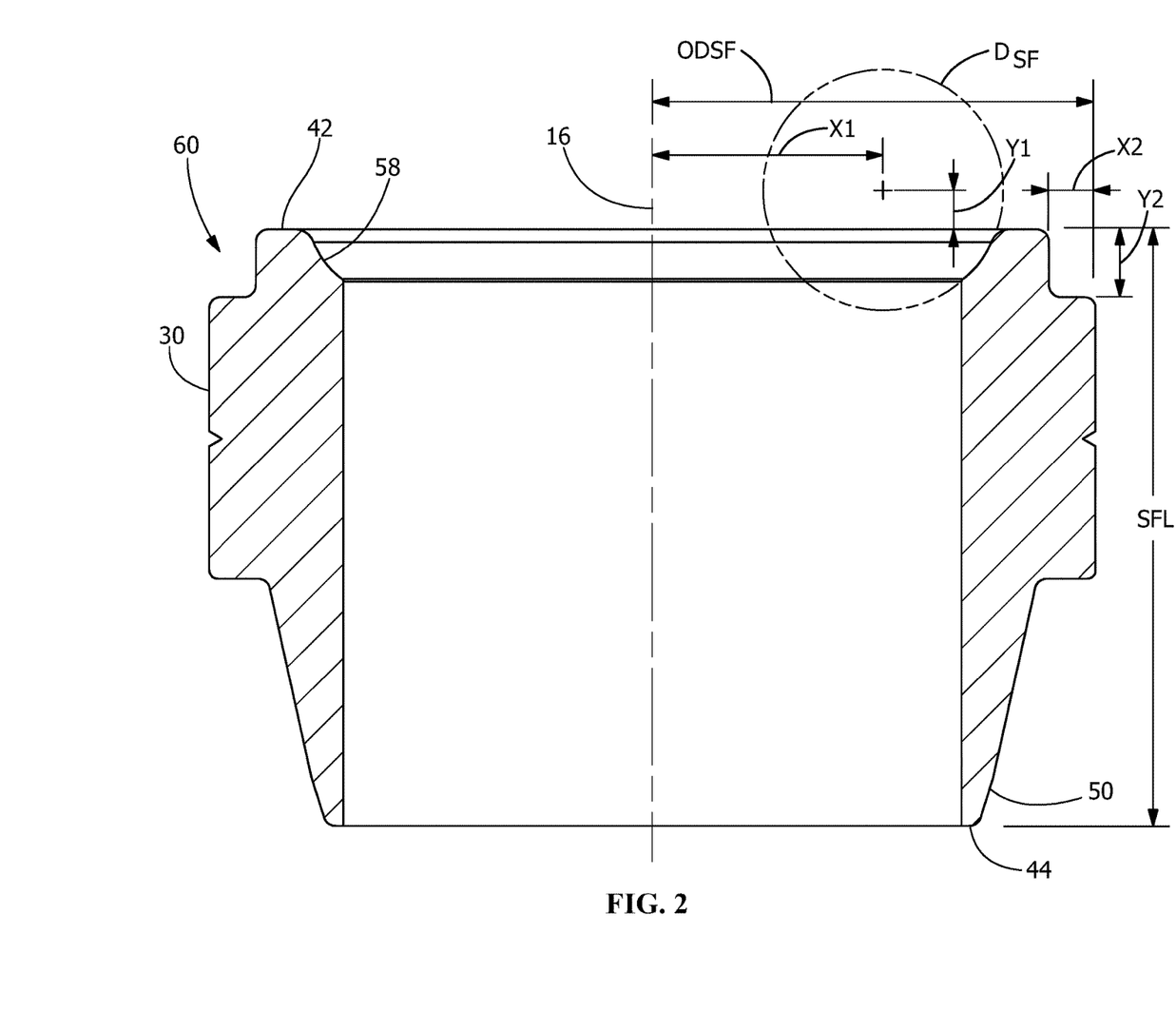
FIG. 2 is an enlarged cross section of an exemplary ferrule according to the present invention.

As shown in FIGS. 1-4, second (front) ferrule 30 has a novel design associated with its positioning relative to first (rear) ferrule 28 and interaction therewith. For purposes of description, and not intending to be limiting, the ferrule geometry is shown in a "nose-down" orientation. The overall length of the second (front) ferrule 30 is referenced at SFL (FIG. 2). The ferrules form a curved pocket where first (rear) ferrule 28 applies a load to second (front) ferrule 30, the pocket defining a diametrical surface having a diameter referenced at $D_{SF}$. Stated another way, the pocket defines a surface of second driven end 42 of second (front) ferrule 30 corresponding to a surface of first driving end 40 of first (rear) ferrule 28. The horizontal center of curvature for the pocket is referenced at X1. Stated another way, the center of curvature for the pocket is positioned a radial distance referenced X1 that is measured from axis 16 in a direction perpendicular to longitudinal axis 16. The vertical center of curvature for the pocket is referenced at Y1. Stated another way, the center of curvature for the pocket is positioned a distance referenced at Y1 that is measured in a direction parallel to longitudinal axis 16 from second driven end 42 of the second (front) ferrule 30. Driven end 42 of second (front) ferrule 30 includes a recessed area or annular shoulder 60 (FIG. 2) which has at least two functions. A first function is to provide relief or clearance when the fitting is in full compression. The relief prevents interference with inside surface 36 (FIG. 1) of drive nut 22 (FIG. 1). A second function is to act as a spring and flex without permanent deformation during axial loading. The spring force allows the forces to be removed and allows for subsequent retightening of the fitting. As shown in FIG. 2, the present invention defines the size and shape of the recess or shoulder 60 to maintain constant ratios to the curvature of the curved surface 58 of the pocket of second (front) ferrule 30. Horizontal relief of the recess or shoulder 60 is a radial distance from an outer diameter of second (front) ferrule 30 that is referenced at X2. Vertical relief of the recess or shoulder 60 is a distance referenced at Y2 that is measured in a direction parallel to longitudinal axis 16 from second driven end 42 of second (front) ferrule 30.

A number of ratios define the second (front) ferrule 30 geometry and which are consistent with all designs, in any size of compression fitting. A ratio is set out in equation 1.

$$2.7 \geq SFL/D_{SF} \geq 2.2 \quad [1]$$

In one embodiment, $SFL/D_{SF}$ is between about 2.7 and about 2.3, about 2.7 and about 2.4, about 2.7 and about 2.5, about 2.7 and about 2.6, about 2.6, between about 2.6 and about 2.2, about 2.6 and about 2.3, about 2.6 and about 2.4, about 2.6 and about 2.5, about 2.5, between about 2.5 and about 2.2, about 2.5 and about 2.3, about 2.5 and about 2.4, about 2.4, between about 2.4 and about 2.2, about 2.4 and about 2.3, about 2.3 or any suitable sub-rage thereof.

The depth of tube insertion or seal depth is referenced at SD as shown in FIG. 1, which defines a distance between seat 18 and driving end 44 of second (front) ferrule 30. Control of tube seal depth SD is a novel aspect of the present invention. As tube thickness is increased to a distance greater than the neck thickness 62 of fitting body 12, the tube 20 manifests a corresponding increase in resistance to deformation. By positioning the ferrules 28, 30 too closely to the end of the tube, the tube wall between the driving end 44 of second (front) ferrule 30 and the end of the tube, also referred to as the lower section of the tube begins to act as an unloaded portion of a cantilevered beam that linearly deflects toward the outer surface 26 of the tube 20, instead of deforming immediately adjacent to driving end 44. In response to the cantilevered beam effect that results in linear deflection of the lower section of tube 20, increased or deeper penetration of second (front) ferrule 30 is permitted. This increased or deeper penetration prevents ideal sealing at the nose 50 of the second (front) ferrule 30 and moves the seal along the angled surface of the second (front) ferrule away from the driving end 44, rendering the seal less effective.

A ratio involving tube seal depth SD that provides improved fitting performance is set out in equation 2.

$$SFL/SD \geq 0.9 \quad [2]$$

In one embodiment, SFL/SD is greater than about 1.0, greater than about 1.1, greater than about 1.2, greater than about 1.3, or any sub-range thereof.

Figure 3:
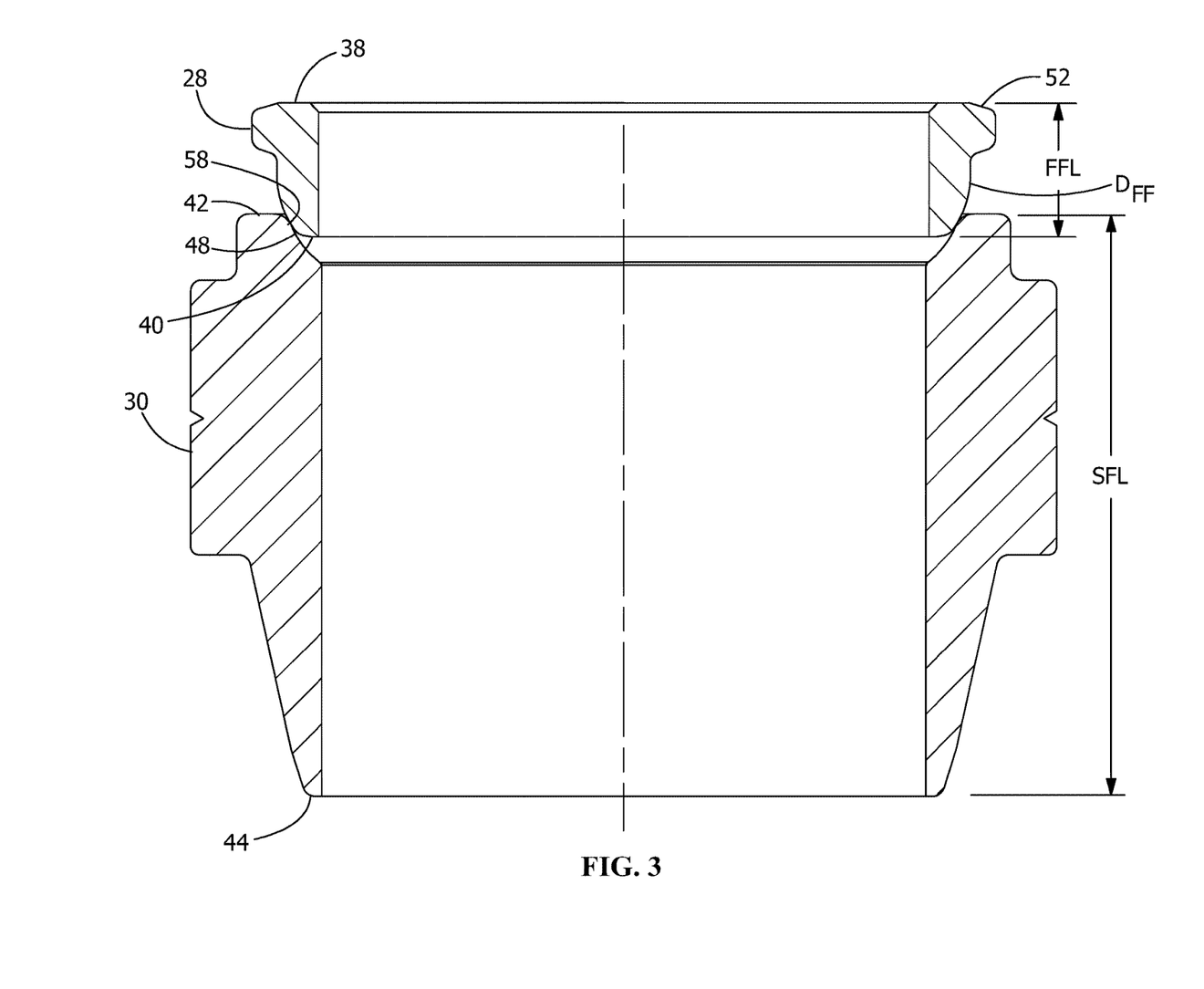
FIG. 3 is an enlarged cross section of an exemplary pair of ferrules according to the present invention.

Another ratio that provides improved fitting performance is directed to a relationship between the second (front) ferrule length SFL and the first (rear) ferrule length FFL shown in FIG. 3 and is set out in equation 3.

$$SFL/FFL \geq 4.0 \quad [3]$$

In one embodiment, SFL/FRL is greater than about 4.1, greater than about 4.2, greater than about 4.3, greater than about 4.4, or any sub-range thereof.

Another ratio that provides improved fitting performance is directed to a relationship between features of second (front) ferrule 30 as shown in FIG. 2. More specifically, a ratio between diameter $D_{SF}$, and a distance (Y1) to the center of the diameter $D_{SF}$ that is measured in a direction parallel to the longitudinal axis 16 from second driven end 42 of second (front) ferrule 30 and is set out in equation 4.

$$6.1 \geq D_{SF}/Y1 \geq 5.4 \quad [4]$$

In one embodiment, $D_{SF}/Y1$ is between about 6.1 and about 5.5, about 6.1 and about 5.6, about 6.1 and about 5.7, about 6.1 and about 5.8, about 6.1 and about 5.9, about 6.1 and about 6.0, about 6.0, between about 6.0 and about 5.4, about 6.0 and about 5.5, about 6.0 and about 5.6, about 6.0 and about 5.7, about 6.0 and about 5.8, about 6.0 and about 5.9, about 5.9, between about 5.9 and about 5.4, about 5.9 and about 5.5, about 5.9 and about 5.6, about 5.9 and about 5.7, about 5.9 and about 5.8, about 5.8, between about 5.8 and about 5.4, about 5.8 and about 5.5, about 5.8 and about 5.6, about 5.8 and about 5.7, about 5.7, between about 5.7 and about 5.4, about 5.7 and about 5.5, about 5.7 and about 5.6, about 5.6, between about 5.6 and about 5.4, about 5.6 and about 5.5, about 5.5 or any suitable sub-rage thereof.

Another ratio that provides improved fitting performance is directed to a relationship between features of second (front) ferrule 30 as shown in FIG. 2. More specifically, a ratio between diameter $D_{SF}$, and a radial distance (X2) that is measured from shoulder 60 to the outer diameter (ODSF) of second (front) ferrule 30 and is set out in equation 5.

$$6.7 \geq D_{SF}/X2 \geq 4.1 \quad [5]$$

In one embodiment, $D_{SF}/X2$ is between about 6.6 and about 4.2, about 4.3, between about 6.5 and about 4.3, about 4.4, between about 6.4 and about 4.4, about 6.3 and about 4.4, about 6.2 and about 4.4, about 6.1 and about 4.4, about 6.0 and about 4.4, about 5.9 and about 4.4, about 5.8 and about 4.4, about 5.7 and about 4.4, about 5.6 and about 4.4, about 5.5 and about 4.4, about 5.4 and about 4.4, about 5.3 and about 4.4, about 5.2 and about 4.4, about 5.1 and about 4.4, about 5.0 and about 4.4, about 4.9 and about 4.4, about 4.8 and about 4.4, about 4.7 and about 4.4, about 4.6 and about 4.4, about 4.5 and about 4.4, about 4.5, between about 6.4 and about 4.5, about 6.3 and about 4.5, about 6.2 and about 4.5, about 6.1 and about 4.5, about 6.0 and about 4.5, about 5.9 and about 4.5, about 5.8 and about 4.5, about 5.7 and about 4.5, about 5.6 and about 4.5, about 5.5 and about 4.5, about 5.4 and about 4.5, about 5.3 and about 4.5, about 5.2 and about 4.5, about 5.1 and about 4.5, about 5.0 and about 4.5, about 4.9 and about 4.5, about 4.8 and about 4.5, about 4.7 and about 4.5, about 4.6 and about 4.5, about 4.6, between about 6.4 and about 4.6, about 6.3 and about 4.6, about 6.2 and about 4.6, about 6.1 and about 4.6, about 6.0 and about 4.6, about 5.9 and about 4.6, about 5.8 and about 4.6, about 5.7 and about 4.6, about 5.6 and about 4.6, about 5.5 and about 4.6, about 5.4 and about 4.6, about 5.3 and about 4.6, about 5.2 and about 4.6, about 5.1 and about 4.6, about 5.0 and about 4.6, about 4.9 and about 4.6, about 4.8 and about 4.6, about 4.7 and about 4.6, about 4.7, between about 6.4 and about 4.7, about 6.3 and about 4.7, about 6.2 and about 4.7, about 6.1 and about 4.7, about 6.0 and about 4.7, about 5.9 and about 4.7, about 5.8 and about 4.7, about 5.7 and about 4.7, about 5.6 and about 4.7, about 5.5 and about 4.7, about 5.4 and about 4.7, about 5.3 and about 4.7, about 5.2 and about 4.7, about 5.1 and about 4.7, about 5.0 and about 4.7, about 4.9 and about 4.7, about 4.8 and about 4.7, about 4.8, between about 6.4 and about 4.8, about 6.3 and about 4.8, about 6.2 and about 4.8, about 6.1 and about 4.8, about 6.0 and about 4.8, about 5.9 and about 4.8, about 5.8 and about 4.8, about 5.7 and about 4.8, about 5.6 and about 4.8, about 5.5 and about 4.8, about 5.4 and about 4.8, about 5.3 and about 4.8, about 5.2 and about 4.8, about 5.1 and about 4.8, about 5.0 and about 4.8, about 4.9 and about 4.8, about 4.9, between about 6.4 and about 4.9, about 6.3 and about 4.9, about 6.2 and about 4.9, about 6.1 and about 4.9, about 6.0 and about 4.9, about 5.9 and about 4.9, about 5.8 and about 4.9, about 5.7 and about 4.9, about 5.6 and about 4.9, about 5.5 and about 4.9, about 5.4 and about 4.9, about 5.3 and about 4.9, about 5.2 and about 4.9, about 5.1 and about 4.9, about 5.0 and about 4.9, about 5.0, between about 6.4 and about 5.0, about 6.3 and about 5.0, about 6.2 and about 5.0, about 6.1 and about 5.0, about 6.0 and about 5.0, about 5.9 and about 5.0, about 5.8 and about 5.0, about 5.7 and about 5.0, about 5.6 and about 5.0, about 5.5 and about 5.0, about 5.4 and about 5.0, about 5.3 and about 5.0, about 5.2 and about 5.0, about 5.1 and about 5.0, about 5.1, between about 6.4 and about 5.1, about 6.3 and about 5.1, about 6.2 and about 5.1, about 6.1 and about 5.1, about 6.0 and about 5.1, about 5.9 and about 5.1, about 5.8 and about 5.1, about 5.7 and about 5.1, about 5.6 and about 5.1, about 5.5 and about 5.1, about 5.4 and about 5.1, about 5.3 and about 5.1, about 5.2 and about 5.1, about 5.2, between about 6.4 and about 5.2, about 6.3 and about 5.2, about 6.2 and about 5.2, about 6.1 and about 5.2, about 6.0 and about 5.2, about 5.9 and about 5.2, about 5.8 and about 5.2, about 5.7 and about 5.2, about 5.6 and about 5.2, about 5.5 and about 5.2, about 5.4 and about 5.2, about 5.3 and about 5.2, about 5.3, between about 6.4 and about 5.3, about 6.3 and about 5.3, about 6.2 and about 5.3, about 6.1 and about 5.3, about 6.0 and about 5.3, about 5.9 and about 5.3, about 5.8 and about 5.3, about 5.7 and about 5.3, about 5.6 and about 5.3, about 5.5 and about 5.3, about 5.4 and about 5.3, about 5.4, between about 6.4 and about 5.4, about 6.3 and about 5.4, about 6.2 and about 5.4, about 6.1 and about 5.4, about 6.0 and about 5.4, about 5.9 and about 5.4, about 5.8 and about 5.4, about 5.7 and about 5.4, about 5.6 and about 5.4, about 5.5 and about 5.4, about 5.5, between about 6.4 and about 5.5, about 6.3 and about 5.5, about 6.2 and about 5.5, about 6.1 and about 5.5, about 6.0 and about 5.5, about 5.9 and about 5.5, about 5.8 and about 5.5, about 5.7 and about 5.5, about 5.6 and about 5.5, about 5.6, between about 6.4 and about 5.6, about 6.3 and about 5.6, about 6.2 and about 5.6, about 6.1 and about 5.6, about 6.0 and about 5.6, about 5.9 and about 5.6, about 5.8 and about 5.6, about 5.7 and about 5.6, about 5.7, between about 6.4 and about 5.7, about 6.3 and about 5.7, about 6.2 and about 5.7, about 6.1 and about 5.7, about 6.0 and about 5.7, about 5.9 and about 5.7, about 5.8 and about 5.7, about 5.8, between about 6.4 and about 5.8, about 6.3 and about 5.8, about 6.2 and about 5.8, about 6.1 and about 5.8, about 6.0 and about 5.8, about 5.9 and about 5.8, about 5.9, between about 6.4 and about 5.9, about 6.3 and about 5.9, about 6.2 and about 5.9, about 6.1 and about 5.9, about 6.0 and about 5.9, about 6.0 or any suitable sub-rage thereof.

Another ratio that provides improved fitting performance is directed to a relationship between features of second (front) ferrule 30 as shown in FIG. 2. More specifically, a ratio between a distance (Y2) measured in a direction parallel to longitudinal axis 16 from second driven end 42 of second (front) ferrule 30 and shoulder 60, and distance Y1 to the center of the diameter $D_{SF}$ that is measured in a direction parallel to the longitudinal axis 16 from second driven end 42 of second (front) ferrule 30 and is set out in equation 6.

$$1.7 \geq Y2/Y1 \geq 1.5 \quad [6]$$

In one embodiment, Y2/Y1 is between about 1.7 and about 1.6, about 1.6, between about 1.6 and about 1.5, about 1.5 or any suitable sub-rage thereof.

Another ratio that provides improved fitting performance is directed to a relationship between features of first (rear) ferrule 28 as shown in FIG. 4. One feature is a diameter $(D_{FF})$ that defines a portion of a surface of first driving end 40 of the first (rear) ferrule 28, which diameter $D_{FF}$ corresponds to curved surface 58 of second driven end 42 of second (front) ferrule 30. The center of curvature of diameter $D_{FF}$ is radially spaced a distance (X3) from longitudinal axis 16. Another feature is second ferrule length SFL. The ratio between diameter $D_{FF}$ and second ferrule length SFL is set out in equation 7.

$$1.9 \geq D_{FF}/SFL \geq 1.6 \quad [7]$$

In one embodiment, $D_{FF}$/SFL is between about 1.9 and about 1.7, about 1.9 and about 1.8, about 1.8, between about 1.8 and about 1.6, about 1.8 and about 1.7, about 1.7, between about 1.7 and about 1.6, about 1.6 or any suitable sub-rage thereof.

Another ratio that provides improved fitting performance is directed to a relationship between features of first (rear) ferrule 28 as shown in FIG. 4. One feature is a diameter $(D_{FF})$ that defines a portion of a surface of first driving end 40 of the first (rear) ferrule 28, which diameter $D_{FF}$ corresponds to curved surface 58 of second driven end 42 of second (front) ferrule 30. Another feature is a distance (Y3) measured in a direction parallel to longitudinal axis 16 from first driving end 40 of the first (rear) ferrule 28 to the center of diameter $D_{FF}$. The ratio between diameter $D_{FF}$ and distance Y3 is set out in equation 8.

$$1.9 \geq D_{FF}/Y3 \geq 1.5 \quad [8]$$

In one embodiment, $D_{FF}$/Y3 is between about 1.9 and about 1.6, about 1.9 and about 1.7, about 1.9 and about 1.8, about 1.8, between about 1.8 and about 1.5, about 1.8 and about 1.6, about 1.8 and about 1.7, about 1.7, between about 1.7 and about 1.6, about 1.6 or any suitable sub-rage thereof.

The present invention has been utilized for tube diameter sizes between at least 1/16 inch and 2 inches, although in other embodiments the tube size diameter may be greater than 2 inches in diameter. It is to be understood that the tube sizes include all corresponding equivalences, such as metric sizes.

Performance was gauged upon successful testing utilizing hydrostatic pressure increases on a representative tubing sample and fitting sample as shown in FIGS. 5-9. Fitting samples were required to withstand pressures that were a multiple of three times the rated working pressure to be validated at that working pressure. Minimum test quantities required 10 sample fittings to pass the same test requirements. Each test specimen consisted of a tube section, a cap fitting and a connector fitting. The cap fitting consisted of a cap body, first (rear) and second (front) ferrules and a drive nut. The cap was assembled to the tube end and utilized standard assembly instructions for the compression fitting. The connector fitting consisted of a connector body (which enabled connection to lab equipment), first (rear) and second (front) ferrules and a drive nut. The connector was also assembled to the opposite end of the tube specimen utilizing standard assembly instructions for the compression fitting. The tube assembly was then filled with water at room temperature, assembled to a hydrostatic test bench and pressurized until failure. Each hydrostatic test continued until either the tube reached its burst pressure or the fitting fails. Fitting failures can also fall into several categories. These include tube slip, fitting leaks and nut shear which result in an immediate loss of pressure.

FIGS. 5-9 graphically represent burst pressure test results for compression fittings of the present invention used with 10 mm tubing. It is noted that the cause of failure was due to tubes rupturing, not the compression fittings.

Testing was also conducted in a similar manner for compression fittings for at least the following tube sizes: ¼ in, ⅜ in, ½ in, ⁹⁄₁₆ in, ¾ in, 1 in, 1¼ in, 1½ in, 2 in, 6 mm (0.23 in), 10 mm (0.39 in), 12 mm (0.47 in), 16 mm (0.63 in), 18 mm (0.71 in), 20 mm (0.79 in), 25 mm (0.98 in), 28 mm (1.10 in), 30 mm (1.18 in), 32 mm (1.26 in), and 38 mm (1.49 in). Tube wall thicknesses were tested for at least the largest thickness for the material selected. Primarily, tube materials tested were 316 SST, 254 SMo, and Super Duplex® 2507.

Exemplary tube materials usable with the compression fittings include 304 SST, 316 SST, 321 SST, 347 SST, Hastelloy® C-276 (subject to completion of successful testing), Duplex® 2205, Super Duplex® 2507, Inconel® 625, Inconel® 718, Incoloy® 825, 254 SMo, and Carpenter® 20.

The test results fall within the following ratio ranges for the tube sizes as follows:

Finite element analysis software Abaqus CAE v6.12 created by Abaqus Unified FEA of Boston, Mass. was utilized for initial design validation.

The assembly time of a compression fitting of the present invention is generally between 30 seconds and one minute. Conversely, the assembly time of conventional cone and thread fitting installations is generally between 15-30 minutes, due to the use of specialized threading tools required to form threads in thick tube walls. The compression fitting of the present invention does not require threads to be formed in the tube walls.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fitting assembly having a longitudinal axis comprising:
    a fitting body having a seat, the fitting body receiving a tube having an outer diameter;
    a threaded drive nut comprising a drive surface and receivable over the outer diameter of the tube;
    a first ferrule receivable over the outer diameter of the tube, the first ferrule having a first driven end and a first driving end and defining a first ferrule length (FFL) therebetween;
    a second ferrule receivable over the outer diameter of the tube, the second ferrule having a second driven end and a second driving end and defining a second ferrule length (SFL) therebetween; and
    a seal depth (SD) of the tube defined by a distance between the seat of the fitting body and the second driving end;
    wherein the drive nut surface engaging the first driven end of the first ferrule, the first driving end engaging the second driven end of the second ferrule, and the second driving end engaging the outer diameter of the tube and the fitting body during assembly of the fitting assembly;
    wherein a surface of the second driven end of the second ferrule corresponding to the first driving end of the first ferrule is a diametrical surface having a diameter ($D_{SF}$);

wherein SFL/SD≥0.9;

wherein 2.7≥SFL/$D_{SF}$≥2.2.

2. The fitting assembly of claim 1, wherein a center of the diameter $D_{SF}$ is positioned a distance (Y1) measured in a direction parallel to the longitudinal axis from the second driven end of the second ferrule, and wherein 6.1≤$D_{SF}$/Y1≥5.4.

3. The fitting assembly of claim 1, wherein a portion of the second driven end of the second ferrule includes an annular shoulder having a radial distance (X2) from an outer diameter of the second ferrule, and wherein 6.7≥$D_{SF}$/X2≥4.1.

4. The fitting assembly of claim 1, wherein a portion of the second driven end of the second ferrule includes an annular shoulder having a distance (Y2) measured in a direction parallel to the longitudinal axis from the second driven end of the second ferrule,
    wherein a center of the diameter $D_{SF}$ is positioned a distance (Y1) from the second driven end of the second ferrule, and wherein 1.7≥Y2/Y1≥1.5.

5. The fitting assembly of claim 1, wherein a portion of a surface of the first driving end of the first ferrule corresponding to the second driven end of the second ferrule is a diametrical surface having a diameter ($D_{FF}$), and wherein 1.9≥$D_{FF}$/SFL≥1.6.

6. The fitting assembly of claim 1, wherein a portion of a surface of the first driving end of the first ferrule corresponding to the second driven end of the second ferrule is a diametrical surface having a diameter ($D_{FF}$), and wherein a center of the diameter $D_{FF}$ is positioned a distance (Y3)

measured in a direction parallel to the longitudinal axis from the first driving end of the first ferrule, and wherein $1.9 \geq D_{FF}/Y3 \geq 1.5$.

7. The fitting assembly of claim 1, wherein $SFL/FFL \geq 4.0$.

8. The fitting assembly of claim 7, wherein a center of the diameter $D_{SF}$ is positioned a distance (Y1) measured in a direction parallel to the longitudinal axis from the second driven end of the second ferrule, and wherein $6.1 \geq D_{SF}/Y1 \geq 5.4$.

9. The fitting assembly of claim 7, wherein a portion of the second driven end of the second ferrule includes an annular shoulder having a radial distance (X2) from an outer diameter of the second ferrule, and wherein $6.7 \geq D_{SF}/X2 \geq 4.1$.

10. The fitting assembly of claim 7, wherein a portion of the second driven end of the second ferrule includes an annular shoulder having a distance (Y2) measured in a direction parallel to the longitudinal axis from the second driven end of the second ferrule, and wherein $1.7 \geq Y2/Y1 \geq 1.5$.

11. The fitting assembly of claim 7, wherein a portion of a surface of the first driving end of the first ferrule corresponding to the second driven end of the second ferrule is a diametrical surface having a diameter ($D_{FF}$), and wherein $1.9 \geq D_{FF}/SFL \geq 1.6$.

12. The fitting assembly of claim 7, wherein a portion of a surface of the first driving end of the first ferrule corresponding to the second driven end of the second ferrule is a radial surface having a diameter ($D_{FF}$), and wherein a center of the diameter $D_{FF}$ is positioned a distance (Y3) measured in a direction parallel to the longitudinal axis from the first driving end of the first ferrule, and wherein $1.9 \geq D_{FF}/Y3 \geq 1.5$.

13. A fitting assembly having a longitudinal axis comprising:
   a fitting body having a seat, the fitting body receiving a tube having an outer diameter;
   a threaded drive nut comprising a drive surface and receivable over the outer diameter of the tube;
   a first ferrule receivable over the outer diameter of the tube, the first ferrule having a first driven end and a first driving end and defining a first ferrule length (FFL) therebetween;
   a second ferrule receivable over the outer diameter of the tube, the second ferrule having a second driven end and a second driving end and defining a second ferrule length (SFL) therebetween; and
   a seal depth (SD) of the tube defined between the seat of the fitting body and the second driving end;
   wherein the drive nut surface engaging the first driven end of the first ferrule, the first driving end engaging the second driven end of the second ferrule, and the second driving end engaging the outer diameter of the tube and the fitting body during assembly of the fitting assembly;
   wherein a surface of the second driven end of the second ferrule corresponding to the first driving end of the first ferrule is a diametrical surface having a diameter ($D_{SF}$);

wherein $SFL/FFL \geq 4.0$.

14. The fitting assembly of claim 13, wherein $SFL/SD \geq 0.9$.

15. The fitting assembly of claim 13, wherein $2.7 \geq SFL/D_{SF} \geq 2.2$.

16. The fitting assembly of claim 13, wherein a center of the diameter $D_{SF}$ is positioned a distance (Y1) measured in a direction parallel to the longitudinal axis from the second driven end of the second ferrule, and wherein $6.1 \geq D_{SF}/Y1 \geq 5.4$.

17. The fitting assembly of claim 13, wherein a portion of the second driven end of the second ferrule includes an annular shoulder having a radial distance (X2) from an outer diameter of the second ferrule, and wherein $6.7 \geq D_{SF}/X2 \geq 4.1$.

18. The fitting assembly of claim 13, wherein a portion of the second driven end of the second ferrule includes an annular shoulder having a distance (Y2) measured in a direction parallel to the longitudinal axis from the second driven end of the second ferrule, and wherein $1.7 \geq Y2/Y1 \geq 1.5$.

19. The fitting assembly of claim 13, wherein a portion of a surface of the first driving end of the first ferrule corresponding to the second driven end of the second ferrule is a diametrical surface having a diameter ($D_{FF}$), and wherein $1.9 \geq D_{FF}/SFL \geq 1.6$.

20. The fitting assembly of claim 13, wherein a portion of a surface of the first driving end of the first ferrule corresponding to the second driven end of the second ferrule is a diametrical surface having a diameter ($D_{FF}$), and wherein a center of the diameter $D_{FF}$ is positioned a distance (Y3) measured in a direction parallel to the longitudinal axis from the first driving end of the first ferrule, and wherein $1.9 \geq D_{FF}/Y3 \geq 1.5$.

* * * * *